United States Patent [19]

Catanzarite

[11] 4,352,867
[45] Oct. 5, 1982

[54] ELECTROCHEMICAL CELL STRUCTURE

[75] Inventor: Vincent O. Catanzarite, Las Vegas, Nev.

[73] Assignee: Altus Corporation, San Jose, Calif.

[21] Appl. No.: 305,463

[22] Filed: Sep. 25, 1981

Related U.S. Application Data

[62] Division of Ser. No. 144,660, Apr. 28, 1980.

[51] Int. Cl.³ .............................................. H01M 6/14
[52] U.S. Cl. .................................. 429/101; 429/152; 429/160; 429/194; 429/210
[58] Field of Search ............... 429/101, 149, 152, 153, 429/160, 210, 194, 199

[56] References Cited

U.S. PATENT DOCUMENTS 4,208,473  6/1980  Bradley ........................... 429/210 X
4,211,833  7/1980  Einstein .......................... 429/210 X Primary Examiner—Anthony Skapars
Attorney, Agent, or Firm—Flehr, Hohbach, Test, Albritton & Herbert

[57] ABSTRACT

An electrochemical cell having two electrodes of opposite polarity cooperating with an electrolyte solution to produce an electrical potential there between during normal operation, configured to minimize explosions upon forced discharge or charging by locating at least a portion of one electrode in close proximity to the other electrode such that a low impedance path is created between the two electrode surfaces whereby the quantity of externally imposed current flowing through the main body of the cell is minimized. In a preferred embodiment, portions of the two electrodes have contiguous surfaces spaced from each other by a porous separator material with the surfaces chosen to allow plating dendritic growth from one electrode to the other at potential differences below that at which electrolysis occurs.

6 Claims, 7 Drawing Figures

ELECTROCHEMICAL CELL STRUCTURE

This is a division of application Ser. No. 144,660, filed Apr. 28, 1980.

BACKGROUND OF THE INVENTION

This invention relates to electrochemical power cells. More particularly, it relates to certain cell designs that minimize the hazards resulting from charging or forced discharging.

Although electrochemical power cells have been known and used extensively for many years, they still have many deficiencies. One of the significant limitations of many cells is a safety hazard when the cell is either force discharged or charged. By forced discharge is meant that an external current is forced through the cell from an external power supply having its negative terminal connected to the positive terminal of the cell and vice versa. By charge is meant an external current is forced through the cell from an external power source having its positive electrode connected to the positive electrode of the cell and vice versa. By cell is meant a single indivisible electrochemical couple consisting of a cathode anode and electrolyte. And by battery is meant an arrangement of more than one cell into an operating multicell unit.

Many cells tend to explode when they are either charged or force discharged. In batteries with low power and energy densities, or cells with small capacities, the hazards are relatively small even if an explosion occurs. However, with large batteries and particularly with new high energy density batteries such as the lithium anode based batteries, explosions can be life endangering events.

It is generally believed that the principal cause of explosions in batteries upon charging or forced discharge is an exothermic reaction due to the reaction of chemical species which were not originally in the battery but were created by electrolysis, or by the distribution of chemicals such as the plating of the anode onto the cathode.

Electrolysis is a well known electrochemical phenomenon. Briefly stated, electrolysis is the decomposition or change in oxidation state of chemicals in liquid form or in solution caused by passing an electrical current through the liquid. As an example, in aqueous electrolyte cells, sufficient external current forced through the cell causes the decomposition of water into hydrogen and oxygen. The hydrogen and oxygen recombine explosively under a veriety of conditions, such as high temperature, spark or the presence of a catalyst. In the case of non-aqueous electrolytes such as those used in lithium cells, there are other chemicals that recombine explosively. For example, in cells where lithium chloride salts are present, electrolysis liberates chlorine gas and elemental lithium which recombine explosively. In the lithium-sulfur dioxide cell, sulfur and oxygen are liberated, both of which combine explosively with lithium under certain conditions. In the highly advanced lithium-oxyhalide cells, such as the thionyl chloride and sulfuryl chloride cells; lithium, sulfur, chlorine and perhaps other unidentified species are liberated by electrolysis and may recombine explosively. If the charging or forced discharging current is sufficiently low, the voltage differential created across the cell may be below the threshold at which electrolysis occurs. In this case, electrolysis does not occur but plating of anode material on to the cathode for fixed discharge and visa versa for charging does occur. And with small particles of anode and cathode material in intimate contact with each other, explosions may occur, particularly if the cell is also exposed to high temperatures. In lithium oxyhalide cells, molten lithium in contact with the oxyhalide usually results in an explosion. Indeed, the lack of a reliable, cost efficient solution to these problems has been a major reason that the lithium-oxyhalide cells have not succeeded commercially.

OBJECTS AND SUMMARY

It is therefore an object of this invention to minimize any risk of explosion in an electrochemical cell as a result of the reaction of electrolysis created chemical species.

Another object of the invention is to minimize the risk of explosion in an electrochemical cell as a result of anode and cathode materials being intermixed through a plating process.

Another object of this invention is to minimize the quantity of electrical current that flows through the cathode and electrolyte material of an electrochemical cell subjected to a forced discharge situation.

Another object of this invention is to minimize the quantity of current flowing through the cathode and electrolyte of an electrochemical cell exposed to a charging current.

Yet another object of this invention is to provide a cell design in which forced discharge current from an external source is shunted directly from a metallic surface at cathode potential to a metallic surface at anode potential via dendritic growth and thereby substantially exclude the externally impressed current from the cell areas vulnerable to electrolysis and plating.

Yet another object of the invention is to provide a cell design for lithium anode, oxyhalide cells in which substantially all forced discharge current from an external source is shunted through the cell by a metallic current path consisting of lithium dendrites.

These and other objects of the invention are achieved by a cell design that effectively provides at least two parallel electrical paths for externally impressed current to follow through the cell. One or more of the paths include substantially all of the reaction byproducts of the cell. At least one path exists that does not contain significant reaction byproducts.

According to one aspect of the invention, externally impressed electric current is diverted from paths through the cathode region to other paths by increasing the electrical resistance of the cathode region as the active cell chemicals are reacted. This is accomplished by choosing the quantity of active chemicals such that the cell is always cathode limited.

According to another aspect of the invention, current is diverted from the paths containing the reaction byproducts by providing an alternative path having a substantially lower resistance.

According to another aspect of the invention, externally impressed current is shunted around the cell through a metallic current path which is formed by dendritic growth that is grown by the action of the externally impressed current on the cell design.

Another aspect of the invention is the following cell design: A fluid tight casing has first and second terminals electrically insulated from each other. Within the casing, there is an anode electrically connected to the first terminal and positioned such that a portion is juxtaposed with but mechanically spaced from the second terminal. A cathode structure located within the casing is spaced from the anode and electrically connected to the second terminal. Electrolyte is located within the casing and in contact with both the cathode and anode and cooperates therewith to produce a voltage difference between the first and second terminals under normal operation. The relative proportion of anode, cathode and electrolyte actively entering into the electrochemical reaction is such that the cell is not electrolyte limited and a predetermined amount of anode material is effectively isolated from the electrochemical reaction by physical isolation from cathode material or by having the total anode material in the cell exceed that required for complete reaction with the active cathode material by a predetermined amount. A first separator is located between the anode and cathode so as to preclude the electrical shorting therebetween. A second separator is located between the anode and the second terminal and is sufficiently porous to allow the growth of dendrites when an externally generated current is impressed on the cell. The second terminal surface juxtaposed with the anode may be of a specific metal to minimize the potential at which dendrites grow.

DESCRIPTION OF PREFERRED EMBODIMENTS

Figure 1:
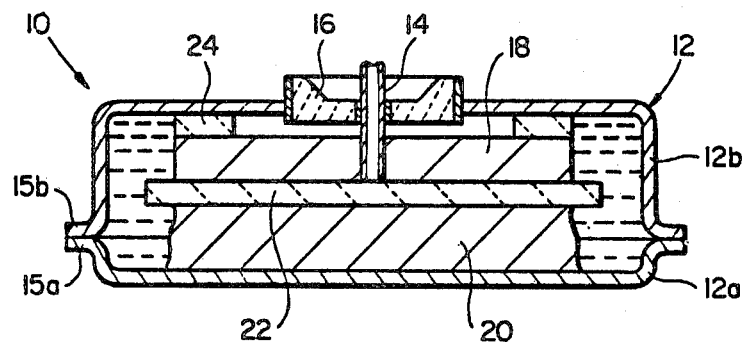
FIG. 1 is a cross sectional view of a cell useful for illustrating the invention.

The invention to be described herein is generally applicable to both primary and secondary cells in which electrolysis resulting from externally impressed currents creates chemical species which under certain circumstances such as mechanical shock, heat, spark, presence of a catalyst, etc. may react explosively. Additionally, the invention applies to situations where electrolysis resulting from an externally imposed current causes the decomposition of cell components into gases and thereby increases the internal vapor pressure to create potentially explosive conditions. Examples of cells that fit into the latter category are a lithium-sulfur dioxide cell and lead-acid. Finally, the invention applies to cells where the intermixing of anode and cathode material occurs from low voltage plating.

A forced discharge situation may occur either by a design mistake, or more commonly, it may occur in a multi-cell series stack when the voltage of a single cell within the stack falls substantially below the voltage of the remaining cells in the stack. In this situation, current is forced through the low voltage cell in the same direction as the cell supplies current when operating normally. When the active materials in the low voltage cell can no longer support the current density required by the external curcuit, cell voltage reversal occurs and the externally impressed electrons pass directly through the cell. When this occurs, the anode and cathode material may be mixed by plating or classical electrolysis may then occur at either electrode surface, and new chemical species not originally in the cell may be created. This process applies not only to primary cells, but also to secondary cells. The new species may be such that they react explosively with other new species or with original cell chemicals.

A charge situation most commonly occurs from an operator error in connecting up cells or it may occur in a parallel configuration of cells when the voltage of one cell falls significantly below that of the remaining cells. In this situation, electrons are forced through the low voltage cell in a direction opposite to that in which they would naturally flow as a result of the cell electrochemical couple. Voltage reversal does not occur.

The danger of charging or forced discharging cells is explosions. Charging or forced discharging causes an externally generated current to be forced through the cell in one direction or the other. This in turn can either intermingle cathode and anode material, cause electrolysis or both.

Electrolysis does not readily occur below a critical interelectrode potential so that very small externally impressed currents passing through the cells or very low resistance cells may not experience electrolysis. However, plating does occur at very low potentials and is nearly always a hazard. The present invention eliminates both hazards.

Clearly if no externally impressed current were allowed to flow through the cell, the explosion hazard from both plating and electrolysis would be completely eliminated. This may be accomplished by using external relays and voltage detectors, but this approach is expensive, impractical for most applications, and not this invention. However, this invention achieves equivalent results by channeling any externally impressed current through the cell so as to avoid plating and electrolysis. An alternative, low resistance, current path is created in parallel with the cell which lowers the voltage across the cell due to the external current below the critical voltage and electrolysis does not occur. And this second path is designed such that any plating that occurs takes the form of dendrites which bridge the gap between the cell terminals and thereby create a metallic short across the cell.

At the same time, the alternative current path must not create an internal self-discharge path for the battery or reduce the effectiveness of the cell under normal operation. This is accomplished by in essence creating a second electrochemical cell with special properties that is effectively connected in parallel with the principal cell to be protected. The second cell must have essentially the same open circuit voltage as the principal cell so that there will be no internal self discharge or shunting effect during storage or normal operation. Additionally, the second cell must be designed to grow dendrites across its terminals when an external current is impressed thereon. The second cell may be either external or internal to the principal cell. The second cell may share common elements such as cathode, anode, electrolyte, and terminals therewith. However, the preferred embodiments incorporate the second cell into the principal cell as an integral part thereof.

In order for dendrites to form, applicant has found that a source of metallic ions and a conductive liquid electrolyte must be present in the second cell at the end of primary cell life.

In designing preferred embodiments of the second cell Applicant has found that dendrite growth improves as the current density and potential across the cell are increased. Indeed, below a critical interelectrode potential, dendrites will not form. If the second cell is integral with the principal cell, the two cells may still be independent with respect to which active components are depleted first except that neither cell may be electrolyte limited.

Although the present invention applies to cells with many different chemistries as described previously, it is needed most in high performance cells such as the lithium, oxyhalide cells described extensively in U.S. Pat. No. 3,929,669, issued to Auborn on Dec. 16, 1975, and in British Pat. No. 1,409,307 issued to Blomgren et al. on Oct. 8, 1975.

Cells using thionyl chloride based electrolyte are described in the preferred embodiments of this invention. This type of cell was chosen for descriptive purposes because it is probably the highest energy and power density cell currently under investigation. In these cells, explosive events resulting from the reaction of species liberated by electrolysis tend to be more hazardous than in lower energy cells.

The theory of operation of lithium anode, thionyl chloride cells indicates that the active cathode material is thionyl chloride, a liquid at room temperature. The cathodic surfaces such as carbon and those metals described in the Auborn patent, referenced previously, are primarily catalytic surfaces on which the reduction of thionyl chloride occurs. However, for purposes of this application, the solution of lithium tetrachlcrealuminate in thionyl chloride, shall be referred to as the electrolyte and the term cathode shall mean the catalyzing surface.

FIG. 1 is a cross sectional view of a lithium anode, thionyl chloride cell in connection with which preferred embodiments of the present invention will be discussed.

Referring to FIG. 1, cell 10 is shown to include an overall casing arrangement 12 which defines an internal, fluid tight chamber. Casing arrangement 12 includes a top portion 12b having a central opening extending therethrough and an outwardly flared circumferential flange 15b located at and around its bottom end. The casing also includes a bottom portion 12a having an outwardly flared circumferential flange 15a which is welded or otherwise suitably fastened to the top cover around the underside of flange 15b. The casing may be constructed of any suitable material so long as it is compatible with the cell chemicals.

The overall casing arrangement 12 includes a pair of electrically insulated terminals, one of which is the casing itself in a preferred embodiment. The other terminal, indicated at 14, is constructed of any suitable electrically conductive material, for example stainless steel, and is elongated in shape. Actually, as will become apparent hereinafter, terminal 14 may be utilized to introduce the electrolyte into the chamber and, hence, is tubular in a preferred embodiment. This terminal extends through the opening in top portion 12b such that one end thereof is within the chamber and an opposite end is outside the chamber. It is this opposite end section which acts as the second external terminal of the battery.

To electrically isolate terminal 14 from the casing, a circumferential insulation member 16 is located within and fills the opening in top portion 12b and fits concentrically around terminal 14, thereby insulating this terminal from the casing. The outer circumferential surface of the insulator is bonded in a continuous fashion to the top portion 12b and its inner circumferential surface is bonded in a continuous fashion to and around the outer surface of terminal 14. The insulator itself may be conventional and it may be conventionally bonded to top portion 12b and terminal 14. However, in a preferred embodiment, the insulator is identical to the ceramic insulator described in U.S. Pat. No. 4,127,702 issued on Nov. 28, 1978.

In addition to overall casing arrangement 12, battery 10 includes an arrangement of chemically interacting components which produce the desired voltage difference across the cell terminals, specifically between terminal 14 and casing 12. These components include an anode 18 and a solid cathode 20 which is spaced from and in confronting relation with the anode. A first separator 22 is positioned between cathode 20 and anode 18 and serves the purpose of preventing cathode 20 and anode 18 from mechanically contacting each other and thereby creating an internal self-discharge path. However, separator 22 is sufficiently porous for electrolyte to pass through it. Additionally, the separator material is inert to the cell chemicals. A wide variety of glass, ceramic and plastic materials have been used for this purpose. Several examples are described in the Auborn and Blumgren patents among which fritted glass, glass mats, porous glass, ceramic mats and porous teflon structures have been found to work. A second separator 24, separates anode 18 from casing 12b. According to one aspect of the invention, separator 24 must provide good mechanical separation and sufficient porosity to allow the flow of ions therethrough. According to another aspect of the invention to be described later, separator 24 must be sufficiently porous to allow dendrites to pass therethrough.

In this electrochemical system, the cathode may be a variety of solid materials. Those described in the Auborn patent have been found to be useful. However, cathodes made at least partially of carbon are preferred. It is desirable to have as much surface area as possible between the cathode material and the electrolyte so that catalytic action and charge transfer can take place most expeditiously. It is therefore, preferred to employ a porous cathode.

Anode 18 is preferably lithium which may be pressed into a nickel screen but may also be other active consumable metals as described in the Blumgren patent.

The remaining volume of a cell is filled with an ionically conductive electrolyte solution, preferably lithium tetrachloroaluminate in concentrations of between 0.5 and 1.8 moles dissolved in thionyl chloride.

Figure 2:
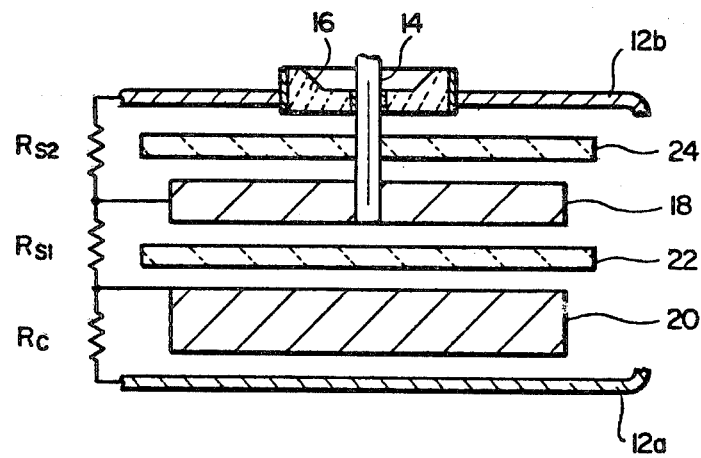
FIG. 2 is a schematic illustration of a cell useful in explaining the invention.

FIG. 2 illustrates in schematic format the impedance of a cell of FIG. 1 to an externally impressed current.

With one polarity, current would flow in terminal 14 and disperse itself along anode 18 and flow through the electrolyte to either surface 12a or 12b. With the opposite polarity, current would flow in the opposite direction but follow the same path. The resistance of the path between anode 18 and terminal surface 12a is the combination of $R_{s1}$, the resistance across separator 22, plus $R_c$, the resistance across cathode 20.

The resistance of the electric current path between anode 18 and terminal surface 12b is $R_{s2}$. Resistance $R_{s2}$ is proportional to the distance separating anode 18 and terminal surface 12b and the resistivity of the electrolyte and inversely proportional to the area of juxtaposition of anode 18 and terminal 12b. Since the electric current paths characterized by resistance $R_{s2}$ and that of the $R_{s1}+R_c$ are in parallel, the current will divide itself in a manner inversely proportional to resistances of those paths. This is important because nearly all of the cell chemicals in solution are located between anode 18 and electrode surface 12, and nearly all of the reaction byproducts are located in cathode 20. Thus by controlling $R_{s2}$ and $R_c$ electric current flowing from anode 18 to terminal 12b can be made to pass through only a small proportion of the cell chemicals and virtually no reaction byproducts and the dangers of electrolysis are reduced. According to this analysis, electrolysis is reduced by making the differential value between $R_{s2}$ and $R_c$ as great as possible. This can be accomplished by any combination of reducing $R_{s2}$ or increasing $R_c$.

According to one aspect of the invention $R_c$ is increased by specifically designing the cell to be cathode limited. That is, at the end of cell life, the cathode becomes polarized by the accumulation of reaction byproducts which impedes any further electrochemical reaction and since they are nonconductive increases the cathode's resistance to externally impressed electric current. In this case separator 24, across which $R_{s2}$ is measured, must allow ions to readily pass therethrough. Thus separator 24 must have a pore size greater than the size of ions to be passed. All of the materials useful for separator 22 are useful for separator 24 according to this aspect of the invention.

According to another aspect of the present invention, $R_{s2}$ is substantially reduced during forced discharge by a cell design that incorporates a secondary cell in which solid metallic dendrites will grow from terminal 12b to anode 18 at the right moment without affecting the normal operation of the cell. Dendrites create a solid ohmic conductive path from second electrode 12b to first electrode 14 forming a very low resistance shunt. As a result, $R_{s2}$ becomes orders of magnitude lower than $R_c$ and substantially all electrolysis is precluded. Additionally, virtually all intermingling of cathode and anode material from plating is eliminated.

In FIG. 2, the secondary cell would consist of anode 18, separator 24 and electrode surface 12b which is at cathode potential and acts as an inefficient cathode current collector. The electrolyte is common between the primary and secondary cell. In this embodiment, there must be sufficient anode material at the end of cell life to allow dendritic growth from anode 18 to electrode 12b.

It is desirable to have both the current delivery and energy capability of the secondary cell much smaller than that of the primary cell. This is conveniently accomplished in a thionyl chloride cell by substituting the high catalytic large surface area carbon of the primary cell with a much lower surface area, lower catalytic copper surface of electrode 12b.

As mentioned previously the potential difference at which dendrites will grow from terminal surface 12b to anode 18 (called plating potential) is important. The plating potential is different for different metal combinations and electrolytes. Generally in an electrochemical system, the anode material and the electrolyte are chosen for their performance properties rather than their dendrite growing properties. As a result dendrites may grow poorly or not at all.

According to the present invention, this problem is greatly reduced by choosing the surface of electrode 12b for optimum plating. Clearly the entire structure of electrode 12b need not be constructed with the optimum plating metal. Rather, it is sufficient to have only the surface of electrode 12b consist of the optimum plating metal. The plating metal, must of course, be compatible with the remaining coil chemicals and not soluble therein.

In the case of a lithium anode, Table 1 below shows, typically, the plating potential of lithium to certain other metals across a 0.030 inch gap in an electrolyte consisting of a 1.6 molar solution of lithium tetrachloraluminate in thionyl chloride.

TABLE 1

| Electrode | Plating Voltage |
|---|---|
| Copper | 0.10 |
| Nickel | 0.20 |
| Lead | 0.22 |
| Antimony | 0.55 |
| Cadmium | 0.35 |
| Tantalum | 0.15 |
| Stainless Steel | 0.85 |

As Table 1 indicates, copper provides the lowest plating voltage and is the preferred electrode surface. However, the other materials enumerated in Table 1 as well as others may be suitable.

Another important factor is the pore size of separator 24 which must be large enough to allow dendrite whiskers to pass therethrough. At the same time, the pore size cannot be so large that the anode and cathode will mechanically touch each other. In general dendrite whiskers will grow in a wide spectrum of diameters. Applicant has observed that in lithium-thionyl chloride battery applications, most dendrite whiskers have a diameter of between 0.0005 and 0.005 inches with the most common diameter occurring around 0.002 to 0.004 inches. Accordingly, a separator that has a pore size of no smaller than 0.001 allows for good dendritic growth. Applicant has also observed that pore sizes of up to 0.050 do not cause shorts. Thus a preferred range of pore sizes is 0.001 to 0.05 inches. A preferred separator for this purpose is a glass or ceramic paper. By paper is meant a mat of small fibers. This structure not only allows the passage of dendrites, but also gives them a certain amount of mechanical support important in the early stages of their growth.

Finally, the length of the path over which dendrites must grow cannot be excessive. Since dendrites are structurally fragile they tend to break before completely bridging large electrode gaps. Large is a relative term and is dependent on many things such as current density, presence or absence of vibration, mechanical or thermal shock and the pressure of a support structure such as applicant's separator. Applicant has found that an electrode gap of 0.020 inches or less is practical; however, an electrode separation of 0.012 inches or less is preferable.

When the foregoing conditions are present, dendrites grow within seconds after the plating potential is reached. Since the objective is to minimize the current flowing through the active battery chemicals, it is desirable to have the lowest plating potential available. This is true because current will flow through the active battery components as long as there is a voltage differential between the two electrodes. Thus at extremely low differential, below 0.1 volts, current will flow through the active battery materials and plating will not occur. Fortunately, this condition rarely occurs. However, it is desirable to have dendritic growth commence at the lowest potential possible.

The dendritic growth mechanism will be described in connection with FIG. 2. When a cell is put into a forced discharge condition, an externally imposed voltage difference between terminals 12 and 14 forces electrons into the cell through terminal 12.

As long as there are sufficient materials for normal electrochemical activity and these materials can sustain the rate of current flow dictated by the external supply of electrons, voltage reversal does not occur. However, as soon as the active electrochemical materials can no longer sustain the current density required by the externally imposed current, a voltage reversal occurs. Terminal 12 goes from positive to negative and terminal 14 goes from negative to positive. When the plating potential between electrode 18 and the particular surface of terminal 12b is reached as discussed in connection with Table 1, positive lithium ions in the electrolyte solution accept electrons from surface 12b and become elemental lithium. The elemental lithium grows on the surface of negative electrode 12b, in small whisker like fibers in the direction of the electrical field; that is, toward anode 18. When the whisker reaches anode 18, an ohmic short is created between the two electrodes. In FIG. 2, resistor $R_{s2}$ would then represent the resistance of the dendrites and would be very low compared with $R_c + R_{s1}$. Thus, for all practical purposes, the current would not flow through any cell chemicals.

Figure 3:
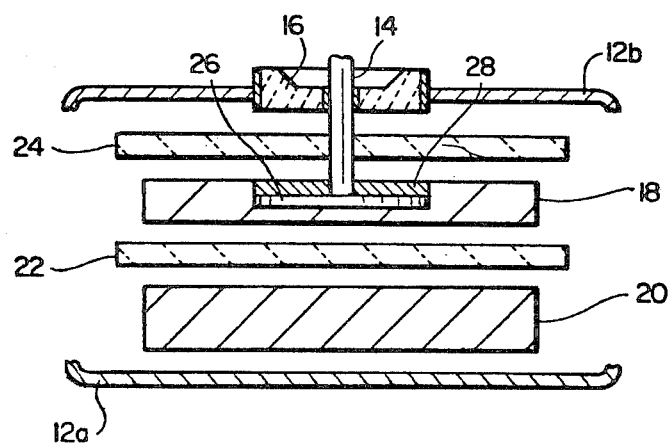
FIG. 3 is an exploded cross-sectional schematic of a single anode cell incorporating the features of the invention.

FIG. 3 shows another embodiment of the present invention. Like reference numerals in the FIGS. 1, 2, and 3 correspond to like parts. In FIG. 3, anode 18 is attached to electrode 14 via a clip 26. Clip 26 is generally a thin disc shaped piece of metal having a hole in the center thereof, designed to be force fit around pin 14. One function of clip 26 is to securely attach anode 18 to pin 14. It is shown in the center of anode 18 illustratively, to indicate that it is desirable to minimize the amount of a dissimilar metal exposed to electrolyte so that internal self-discharge galvanic currents are also minimized.

According to this embodiment of the invention, clip 26 performs an additional useful function of isolating a portion of the lithium in anode 18 from reacting with the other cell active components in the normal cell discharge processes. The isolated lithium is then available at the end of cell life for dendritic growth. The portion of the lithium anode so isolated is generally illustrated by the hatching referenced by numeral 28. With this embodiment, the primary cell may be anode or cathode limited. The secondary cell consisting of the lithium isolated by clip 26, separator 24 and that portion of electrode surface 12b juxtaposed with lithium anode 28 will provide protection via dendritic growth in any event.

Additionally, this embodiment is preferred over that of FIG. 2 because the small surface area of juxtaposed anode and cathode is substantially smaller than that of the primary cell. This causes an increased current density and potential across the secondary cell which in turn creates improved conditions for dendritic growth.

While the precise relative geometry of the primary and secondary cell as well as electrolyte conductivity are matters of design judgement, it is desirable both functionally and economically to make the secondary cell very small relative to the primary cell.

Figure 4:
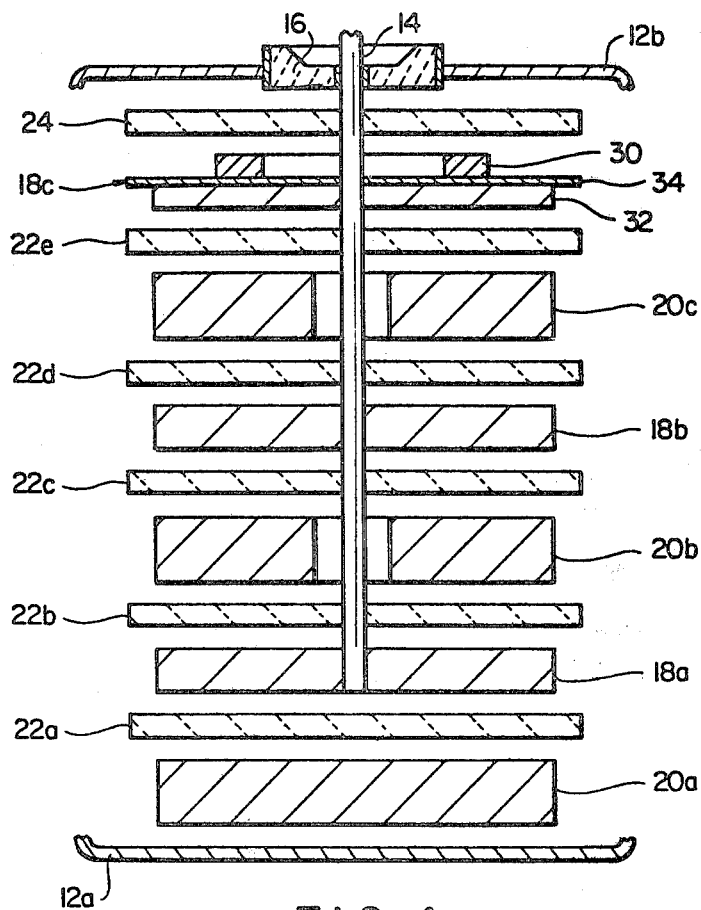
FIG. 4 is an exploded cross-sectional schematic view of a multi-electrode cell incorporating an alternative embodiment of the invention.

FIG. 4 is an exploded view of a multi-anode configuration utilizing the present invention. Cathodes 20a, 20b, and 20c are separated by separators 22a, 22b, 22c, 22d, and 22e from anodes 18a, 18b, and 18c. Separator 24 separates anode 18c from electrode surface 12b. Anode 18c is divided into two sections 30 and 32 by a solid separator 34. Anode portion 32 is designed to interact with cathode 20c in the normal operation of the cell. Anode section 30 which may be in the shape of a ring as shown is isolated from the remainder of the cell by a non-porous isolating sheet 34 such as stainless steel, nickel or non-porous ceramic. With this arrangement, anode section 30 is intact at the end of cell life and available for dendritic growth from electrode surface 12b through separator 24 to anode section 30. For proper operation, cathodes 20a, 20b, and 20c must be electrically interconnected (electrical connection not shown for the sake of clarity). Likewise, anodes 18a, 18b and 18c must be electrically interconnected (shown schematically connected by central terminal 14). Care must be taken to ensure that cathode and anode parts do not physically contact each other and internally short the cell.

An alternative embodiment (not illustrated), calls for an increase in the thickness of anode 18c so that at the end of cell life, a predetermined quantity of anode material remains intact and is available for dendritic growth from electrode surface 12b through separator 24 to the anode.

Figure 5:
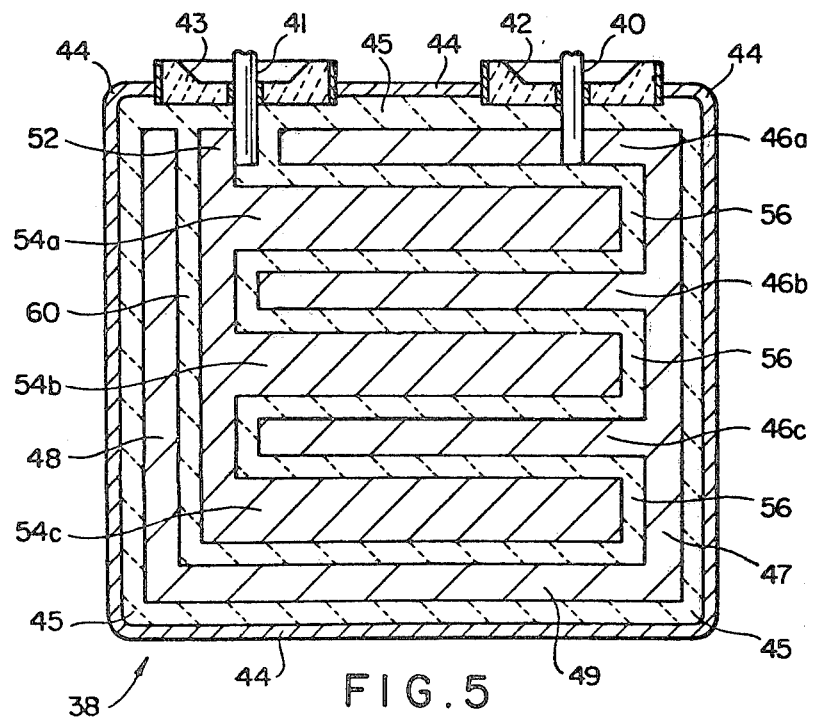
FIG. 5 is a cross-sectional schematic view of an alternative multi-electrode cell incorporating the features of the invention.

FIG. 5 shows a cell 38 having an alternative multi-anode and cathode arrangement, wherein the casing does not serve as one terminal. In this configuration, an anode terminal 40, and a cathode terminal 41 feed through a first insulator 42 and a second insulator 43 into the interior of a fluid tight compartment defined by said terminals insulators and a casing 44.

Contiguous to casing 44, pierced only by terminals 40 and 41 is separator 45 which is required to isolate all active and current carrying components from casing 44.

Connected to terminal 40 is an anode structure consisting of three plates 46a, 46b and 46c which are interconnected by a conductive member 47. Member 47 continues around at least a portion of the circumference of cell 38 contiguous to separator 45. The extended portion of conductive member 47 is referenced in FIG. 5 by numeral 48. Conductive member 47 may also extend across all or part of the bottom of the cell as indicated by reference numeral 49.

A conductive extension member 52 of cathode terminal 41 interconnects three cathodes plates 54a, 54b, and 54c. Member 52 may be made of any good conductor that is nonreactive with the battery chemistry. Typical examples are nickel and stainless steel. Separator 56 mechanically separates the various cathodic and anodic surface from each other.

It is important that conductive member 48 and extension member 52 be overlapping with juxtaposed surfaces separated only by a portion of separator 56 indicated by reference numeral 60. The overlap need not be 100%; however, the larger the overlap, the lower the electrical resistance therebetween to an externally impressed current. With this arrangement any externally imposed currents in either direction will be substantially shunted to flow from terminal 40 to terminal 41 through separator 60, where the impedance path is minimized.

Where conductive member 48 and extension member 52 are contiguous, conductive member 48 may have surfaces of the same metal as the anode, in this case lithium. In the case of a forced discharge polarity, dendrites will grow from extension member 52 to conductive member 48 which further improves the shunting phenomenon. This is, of course, enhanced if the surface of extension member 52 is plated as previously described. When current is forced through the cell in the charge direction, dendrites may grow more slowly due to insufficient lithium ions, but the impedance path between member 48 and 52 is still much lower than through the body of the cell and electrolysis is significantly reduced.

Figure 6:
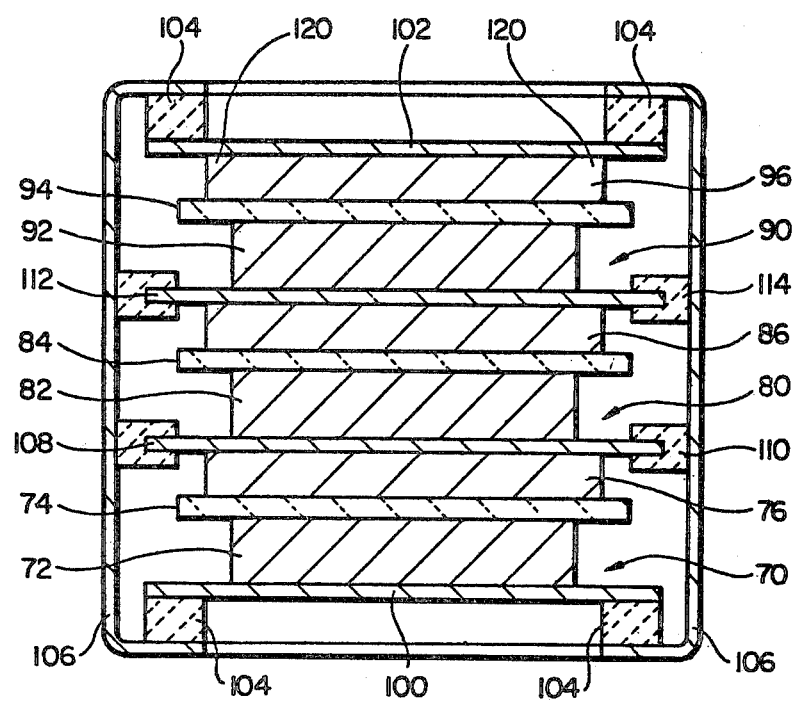
FIG. 6 is a cross-sectional schematic view of a multi-cell, bipolar battery which includes the invention.

FIG. 6 illustrates a bipolar electrode battery configuration (sometimes called a pile battery) consisting of three cells in a common housing. More particularly, cell 70 consists of cathode 72, separator 74, and anode 76. Cell 80 consists of cathode 82, separator 84 and anode 86. Cell 90 consists of cathode 92, separator 94 and anode 96. Cathode 72 is electrically and mechanically attached to external terminal 100. Anode 96 is electrically and mechanically attached to external terminal 102. Terminals 100 and 102 are joined to casing 106 by insulating seals 104 and thereby define a fluid tight chamber. Additionally, anode 86 and cathode 92 are electrically connected to opposite sides of metallic spacer 112, which is in turn joined to casing 106 through insulating spacers 114.

In operation, anode 76 and cathode 72 cooperate to form one cell which is connected in series with the cell consisting of anode 86 and cathode 82, which is in turn, connected in series with the cell consisting of anode 96 and cathode 92.

In this battery configuration, the design must provide protection from externally imposed currents for each cell. This is accomplished in the same fundamental manner as with the single cells. That is, each cell is designed such that a portion of the anode surface is positioned immediately adjacent to a metallic surface at the cathode potential, separated only by a porous separator. In FIG. 6, for each cell, the anodes 76, 86 and 96 are larger in area than their corresponding cathodes, 72, 82 and 92. The section of each anode which extends beyond its corresponding cathode, indicated by reference number 120, fits this design criteria. (FIG. 6 is schematic. In reality, anode surface 120 would be separated from spacer 112 by the thickness of separator 94. The resistance across cell 90 is much lower in this area to an externally impressed current than through the cathode and dendrites will grow to further reduce the resistance).

Applicant's invention may also be used on a spiral-wound cell. Spiral wound cells are conventionally fabricated by forming long rectangular sheets of anode material, cathode material and separator material; placing the sheets contiguous to each other with the separator sheets on both sides of the anode sheet, rolling up the sheet into a cylinder; positioning the cylinder in a fluid casing containing electrolyte and first and second terminals electrically insulated from each other connected respectively to the anode sheet and cathode sheet and electrically communicating between the interior and exterior of the casing.

Figure 7:
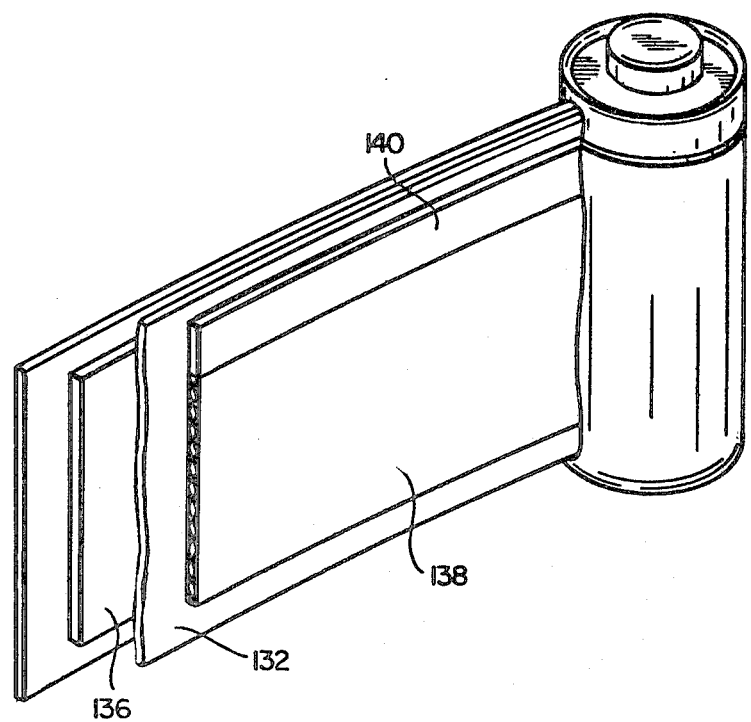
FIG. 7 is a perspective view of a spiral wound cell incorporating the invention partly unwound for illustrative purposes.

FIG. 7 is a perspective view of a partially unwound spiral-wound cell which illustrates the application of the present invention to this type of cell construction. Referring to FIG. 7, sheets 130 and 132 of separator material surround sheet 136 of anode material. Cathode sheet 138 is juxtaposed with anode sheet 136 but is separated therefrom by separator 132. Cathode sheet 138 consists of a typical cathode or current collector material bound to a screen 139, which is in turn connected to a solid tab electrode 140 of conductor material. Typically, both the screen and tab will be of stainless steel or nickel and may be plated to minimize the plating voltage for dendrite growth. The anode is typically an active material such as lithium pressed into a nickel or stainless steel screen.

Applicant's invention is preferably practiced in a spiral-wound cell by having a portion of anode sheet 136 juxtaposed with cathode tab electrode 140 but separated therefrom by a separator sheet 132. In this way, a portion of the anode is contiguous to an electrically conducting surface at cathode potential and the mechanism of applicant's invention previously described will operate.

I claim:

1. A bipolar electrical battery including a plurality of cells providing the primary electrochemical path for current through said battery, each cell having
   cathode means connected to a second cell terminal,
   anode means connected to a first terminal,
   separator means located between said anode means and cathode means, and
   electrolyte;
wherein each cell has at least one cell terminal being common with a cell terminal of an adjacent cell;
   said battery further characterized in that in each cell a portion of said anode means is juxtaposed with the said second cell terminal but mechanically spaced therefrom by said separator means thereby forming a low-resistance secondary electrochemical path for current externally imposed upon said battery which is different from said primary path, said second path including in each cell said portion of said anode means, said separator means and said second cell terminal.

2. The battery of claim 1 wherein said anode means are lithium.

3. The battery of claim 2 wherein said separator means is a porous ceramic material.

4. The battery of claim 3 wherein said electrolyte is a solute dissolved in an oxyhalide.

5. The battery of claim 1 further characterized by said second cell terminal having a surface selected from the group consisting of copper, nickel, cadmium, tantalum, and stainless steel.

6. The battery of claim 1 wherein in each cell the surface of said cathode means is smaller in area than the surface of said anode means.

* * * * *